Nov. 29, 1927.
V. P. RUMELY
1,651,351
BRACE FOR SHIPPING VEHICLES IN FREIGHT CARS
Filed Jan. 30, 1925
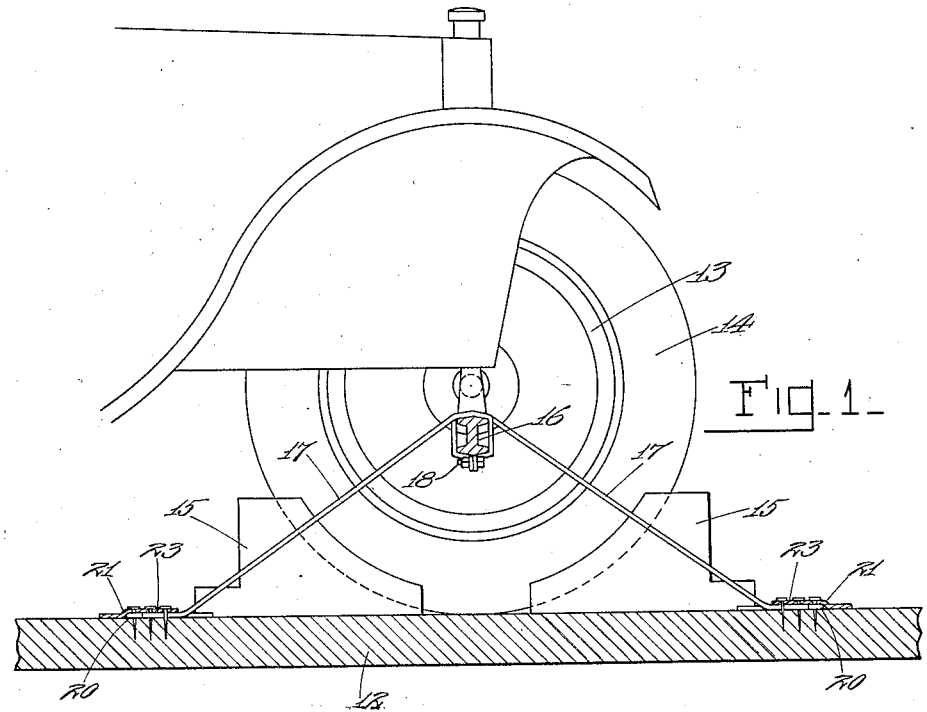
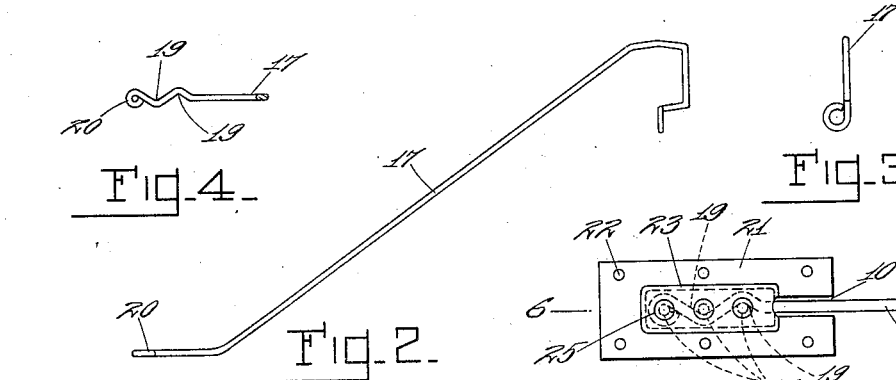
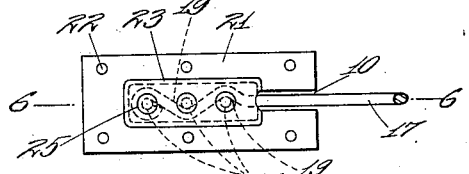
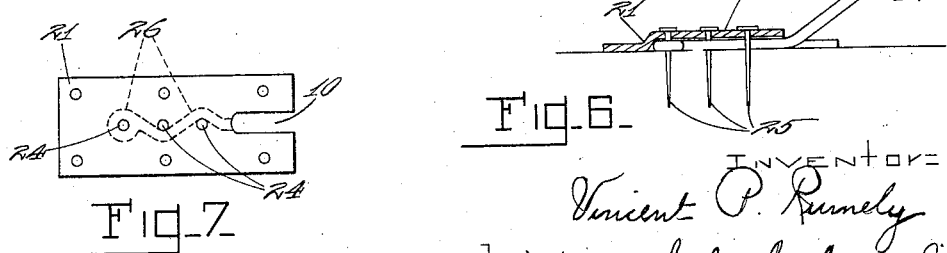
INVENTOR
Vincent P. Rumely
by Macleod, Cahn, Copeland & Lee Patented Nov. 29, 1927.

1,651,351

UNITED STATES PATENT OFFICE.

VINCENT P. RUMELY, OF DETROIT, MICHIGAN, ASSIGNOR TO HUDSON MOTOR CAR COMPANY, OF DETROIT, MICHIGAN, A CORPORATION OF MICHIGAN.

BRACE FOR SHIPPING VEHICLES IN FREIGHT CARS.

Application filed January 30, 1925. Serial No. 5,814.

This invention relates to a device for bracing vehicles while in transit in freight cars which is of the general character of the device shown in my co-pending application, Serial No. 741,828, brace for shipping vehicles in freight cars, filed October 6, 1924. The brace shown in my co-pending application is a compression brace which includes rigid members which extend from the vehicle axle to the car floor and prevent forward and backward movement of the vehicle. Due to the rigidity and stiffness of the bracing members, the strains to which the bracing members are subjected are transmitted from the axle of the vehicle to the car floor.

The present invention has for its object to provide a brace which is capable of holding a vehicle in position on the floor of a freight car by means of tension members which prevent the movement of the vehicle due to the pull which they exert. The tension members are secured to an axle of the vehicle and are firmly anchored to the freight car floor, the members extending upwardly to the axle of the vehicle. The tension method of holding the vehicles in position has considerable value in that a brace thus applied to the vehicle not only prevents a longitudinal movement of the vehicle, but exerts an angular downward pull on the vehicle thereby restraining its tendency toward vertical movement during transportation. Many devices for holding vehicles in place during shipment have been used, such as strap or wire hold-downs, metal and wooden bucks which carry the weight of the vehicle and ordinary blocks or chocks placed in front and back of the wheels. It has also been necessary to use a number of these devices to properly secure the vehicle in place. The strap or wire hold-downs have been made of heavy material making them expensive and the wooden blocks or chocks which have been used in addition to the hold-downs have been placed on both sides of each of the four wheels of the vehicle. When the vehicles are secured in this manner and particularly when they are equipped with balloon tires, it has been found that the hold-downs tend to work loose permitting the wooden blocks or chocks to injure the tires. This is largely due to the tendency of balloon tires to bounce as a result of the shocks to which the freight car is subjected resulting in the loosening of the hold-downs. Once the hold-downs are loosened, the vehicle is permitted to move vertically, to rock back and forth between the blocks and to ride up the blocks in one direction or the other as far as permitted by the looseness of the hold-downs. My present invention not only holds the vehicle against longitudinal movement but holds the wheels of the vehicle down between the wheel blocks and counteracts the tendency of the wheels to roll up the block angles. If auxiliary hold-downs are used in conjunction with my tension members, the strain on these hold-downs is greatly diminished. Furthermore, my brace is of a simple construction and so inexpensive to make as to permit the same to be discarded after a single shipment so that it need not be returned to the shipper.

Another object of my invention is to provide a novel anchoring plate for securing the ends of the tension members of my brace to the car floor, this plate being constructed to accommodate the shaped ends of the tension members.

The invention will be fully understood from the following description when taken in connection with the accompanying drawings and the novel features thereof will be pointed out and clearly defined in the claims at the close of this specification.

In said drawings:

Fig. 1 is a diagrammatic view, partly in section, of the forward part of a motor vehicle as secured to the floor of a transporting car, having my brace applied to the front axle.

Fig. 2 is a side elevation of one of the inclined tension members of the brace.

Fig. 3 is a fragmentary side view of the member shown in Fig. 2, showing the upper end of the inclined member which is fastened about the vehicle axle.

Fig. 4 is a plan view of the foot of the brace member which is anchored to the car floor.

Fig. 5 is an enlarged plan view of my novel anchoring plate for the foot of the brace member.

Fig. 6 is a section taken on the line 6—6, Fig. 5.

Fig. 7 shows another form of anchor plate.

Referring to Figs. 1 and 2, at 12 is shown a portion of the floor of a freight car to which the vehicle is secured. The wheel 13 and tire 14 of the vehicle are shown blocked in position by means of the blocks or chocks 15 located in front and back of the tire and spiked to the car floor. 16 is the I-beam front axle of the vehicle which is shown in section to illustrate the application of my brace thereto. The brace comprises preformed wire members 17 which are secured in place about the axle 16 and anchored at their opposite ends to the freight car floor 12. Each of the members 17 is bent at its upper end so as to pass over and around the axle 16 to a point beneath the axle, the ends of the members being provided with eyelets and secured in place about the axle 16 by a bolt 18. It will be observed that the ends of each of the members 17 pass around three corners of the axle 16. The frictional engagement with the axle at these three points prevents the members 17 from being pulled around the axle even when the most severe strain is thrown on either of the members 17.

The free lower end or foot of each of the members 17 is of sinuous form so as to have one or more waves 19 therein (see Figs. 4 and 5) and terminates in the eyelet 20. Specially formed foot plates 21 are used to anchor the said ends of the members 17 to the car floor. The plates 21 are provided with nail or spike holes 22 around their marginal edges which assist in securing the plate to the floor of the car. Each plate 21 is provided with a raised portion 23, adapted to accommodate the waved and eyelet end of the members 17. The end of the member 17 is shaped to lie flat on the car floor and the plate 21 is placed thereon, the inclined portion of the member 17 extending out through the slot 10 in the plate. The raised or cupped portion 23 of the plate is provided with a series of spike or nail holes 24 through which the spikes 25 are driven. One of the spikes 25 passes through the eyelet 20 of the member 17, the others by reason of the location of the remaining holes 24 in the plate 23, engage the depressions or concave portions in the waves 19 alternately on opposite sides of the member 17.

As shown in Fig. 7, the plate 21, instead of having the rectangular cupped portion 23, is molded or otherwise shaped as shown at 26 to the shape of the waved and eyelet end of the members 17. In this construction, the complementary groove 26 in the plate in addition to the spikes 25 assists in anchoring the members 17 to the foot plates and to the car floor. It will be understood that the ends of the tension members 17 may be provided with as many waves 19 as desired and a corresponding number of spikes or key nails 25 used.

What I claim is:

1. A tension brace for vehicles shipped in freight cars comprising two normally separate wire members, the upper ends of said members being secured together, the said members being wrapped around the axle of a vehicle in opposite directions and each passing around three corners of said axle, said members extending to a supporting surface for said vehicle on opposite sides of the axle and means for anchoring the said members to said surface.

2. A tension brace for vehicles shipped in freight cars comprising two normally separate wire members, the upper ends of said members being secured together beneath the axle of a vehicle, the said members passing over the axle and extending from the top of the latter in opposite directions to a supporting surface for said vehicle, and means for anchoring the said members to said surface.

In testimony whereof I affix my signature.

VINCENT P. RUMELY.